Patented Oct. 12, 1954

2,691,683

UNITED STATES PATENT OFFICE 2,691,683

SYMMETRICAL BIS($\alpha,\alpha$-DIALKYL-$\alpha$-ARYL-METHYL) PEROXIDES AND METHOD OF PREPARATION

Eugene J. Lorand, Wilmington, Del., and John E. Reese, St. Simons Island, Ga., assignors to Hercules Powder Company, Wilmington, Del., a corporation of Delaware No Drawing. Application July 1, 1950, Serial No. 171,746

6 Claims. (Cl. 260—610)

This invention relates to symmetrical dialkylarylmethyl peroxides and to the method of their preparation. More particularly, it relates to peroxides of the formula

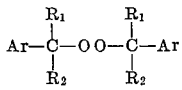

and to the method of their preparation from $\alpha,\alpha$-dialkyl-$\alpha$-arylmethyl hydroperoxides of the formula

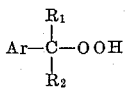

where Ar represents an aryl group and $R_1$ and $R_2$ represent alkyl groups.

Numerous alkyl peroxides are known but bis-($\alpha,\alpha$,-dialkyl-$\alpha$-arylmethyl) peroxides have not heretofore been produced.

In accordance with the present invention, bis-($\alpha,\alpha$-dialkyl-$\alpha$-arylmethyl) peroxides have now been prepared by heating the corresponding $\alpha,\alpha$-dialkyl-$\alpha$-arylmethyl hydroperoxide in the absence of active decomposition catalysts at a temperature within the range of about 100° C. and 180° C. and separating the bis($\alpha,\alpha$-dialkyl-$\alpha$-arylmethyl) peroxide from the pyrolyzate.

The process of producing bis($\alpha,\alpha$-dialkyl-$\alpha$-arylmethyl) peroxides by pyrolysis of $\alpha,\alpha$-dialkyl-$\alpha$-arylmethyl hydroperoxides thus requires specific conditions to avoid the already known decomposition of the hydroperoxide to alcohols, ketones, etc. The pyrolysis must be carried out in the absence of any substantial amount of acids which catalyze decomposition of the hydroperoxide into a ketone and phenol, in the absence of any substantial amount of alkali which catalyzes degradation of the hydroperoxide to the alcohol, in the absence of heavy metal compounds which catalyze decomposition of the hydroperoxide to products of lower molecular weight, and in the absence of compounds having a tertiary hydrocarbon radical which undergo reaction with hydroperoxides leading to the formation of tertiary alcohols, particularly in the presence of heavy metal catalysts. The preferred conditions can ordinarily be attained simply by using substantially pure materials. If desired, further precaution may be taken as by pyrolyzing under conditions that any free oxygen in the system or liberated in side reactions or molecular oxygen is withdrawn or is diminished in activity as by operation under reduced pressure, as by causing any volatile acids produced in the pyrolysis to volatilize by, for instance, operation under reduced pressure, or by other obvious methods. These further precautions need not be taken, however, if the pyrolysis is carried out on substantially pure hydroperoxides.

The following examples constitute specific illustrations of the manner in which these novel bis($\alpha,\alpha$-dialkyl-$\alpha$-arylmethyl) peroxides may be produced. All parts are by weight.

Example 1

In a flask fitted with a stirrer, a thermometer, a nitrogen inlet tube and a reflux condenser serving as a nitrogen outlet tube was placed 20.6 parts 97.8% $\alpha,\alpha$-dimethyl-p-methylbenzyl hydroperoxide. While maintaining a nitrogen atmosphere, the $\alpha,\alpha$-dimethyl-p-methylbenzyl hydroperoxide in the flask was heated and stirred for 7.3 hours at 120° C. The course of the reaction was followed by determining the hydroperoxide content in samples taken at intervals. A total of 4.6 parts was taken for this purpose. At the end of the heating period, the product was diluted with benzene (20 parts) and petroleum ether (20 parts) and washed with three portions (10 parts) of 1% sodium hydroxide followed by one wash with water (20 parts).

The washed product was distilled at 1.7 mm. (Hg) pressure with a pot temperature of 96° C. to distill off 3.8 parts. The residue amounting to 3.9 parts was extracted with 140 parts pentane. A small amount of brown resin did not dissolve. The pentane solution was then passed through a column of 200-mesh activated alumina. This was followed by 50 parts pentane. A sharp amber band appeared near the top of the alumina column followed by four distinct yellow bands below. The pentane solution passing through the column as a colorless liquid was evaporated at 0.3 mm. to obtain a crystalline mass of bis-($\alpha,\alpha$-dimethyl-p-methylbenzyl) peroxide free of $\alpha,\alpha$-dimethyl-p-methylbenzyl hydroperoxide as shown by infrared analysis for the —OH group. After recrystallization from ethyl alcohol, the substance melted at 55°–57° C.

Example 2

Seventy-five parts pure $\alpha,\alpha$-dimethylbenzyl hydroperoxide which had been prepared by precipitating the sodium hydroxide complex and then liberating the $\alpha,\alpha$-dimethylbenzyl hydroperoxide with dilute sulfuric acid, was placed in a reaction vessel provided with a reflux condenser, an agitator, and means for applying external heat. The total volume of the reaction vessel was relatively large, 6–7 times that of the charge, and the air in it was displaced by a slow current of nitrogen. The temperature of the well-agitated liquid was kept at 106–132° C. for a total reaction time of 392 minutes. The hydroperoxide content of the reaction mixture dropped to 13.7%. The volatile by-products of the reaction were removed by distillation, gradually reducing the pressure to 1 mm. Hg, but keeping the pot temperature below 95° C. The residue, 34.5 parts, was extracted with 62 parts pentane and the solution sent through a column of alumina (200-mesh) to absorb the impurities. The clear, water-white liquid was combined with 62 parts column washes and the pentane removed by distillation. The 20.3 parts crystalline white residue was bis(α,α-dimethylbenzyl) peroxide.

*Example 3*

A pyrolyzed α,α-dimethylbenzyl hydroperoxide such as that obtained in Example 2 was decolorized in pentane solution by means of a siliceous filter aid, then the solvent and the volatile by-products were distilled off from the colorless filtrate at reduced pressure. The residual oil was taken up in pentane and crystallized at −20° C. The crystals were dissolved in 3.6 times their weight of methanol, then precipitated by the addition of 2% (based on the crystals) of water whereby pure bis(α,α-dimethylbenzyl) peroxide melting at 40.5° C. was obtained. The product is relatively stable on heating up to about 150° C. but undergoes slow decomposition above about 150° C. sufficiently to give an odor of acetophenone at 150–160° C.

*Example 4*

α,α-Dimethyl-α-(2-naphthylmethyl) hydroperoxide was prepared by oxidizing β-isopropyl naphthalene in a dispersion with 2% aqueous sodium hydroxide using commercial oxygen at 90° C. until a hydroperoxide content of 38% was reached. The hydroperoxide was purified by precipitation with 30% sodium hydroxide and subsequent neutralization with dilute aqueous mineral acid.

A sample of α,α-dimethyl-α-(2-naphthylmethyl) hydroperoxide amounting to 51 parts by weight was then heated at 120–125° C. for approximately 7 hours. The residual hydroperoxide content at the end of that time was about 1%. The pyrolysis mixture was stirred with 50 parts methanol at about 0° C. to crystallize and 21 parts almost colorless crystals of bis [α,α-dimethyl-α-(2-naphthyl)methyl] peroxide melting at 142–144° C. were isolated by filtration.

The pyrolysis is believed to involve free radicals having a very short half life and in line with this belief it has been found that the reaction must be carried out in the liquid phase and in high concentration for optimum yields. If diluents are used for the reaction, the yield falls off rapidly and side reactions may take place to a much greater extent. These side reactions may also involve the diluent if one is used, particularly if the diluent has a tertiary hydrocarbon radical such as an isopropyl group as in cumene or cymene. For best results substantially pure hydroperoxide is pyrolyzed in the absence of a solvent.

The temperature at which the α,α-dialkyl-α-arylmethyl hydroperoxides of this invention may be pyrolyzed to the corresponding symmetrical peroxides may be broadly stated as being within the range of about 100° C. to about 180° C. At the lower temperature range the pyrolysis proceeds quite slowly and the yield is diminished.

The low effective concentration of primary decomposition products of the hydroperoxide probably causes the reduced yield. At the higher temperature, side reactions are greater and the yield is also lower. The temperature range for optimum yield has been found to be from about 120° C. to about 140° C.

The process of pyrolysis is not limited to the use of any particular apparatus.

The bis(α,α-dialkyl-α-arylmethyl) peroxides which are produced in the process of this invention are symmetrical peroxides of the formula where Ar represents aryl groups or substituted

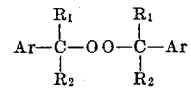

aryl groups such as phenyl, naphthyl (α- or β-), Ar-tetrahydronaphthyl, tolyl, ethylphenyl and other non-tertiary alkyl-substituted phenyl groups, and $R_1$ and $R_2$ may be the same or different and represent hydrocarbon radicals such as methyl, ethyl, propyl, butyl, etc. Since symmetrical peroxides are produced, $R_1$, $R_2$ and Ar represent the same groups in each occurrence in the formula. These peroxides are made by pyrolysis of the corresponding hydroperoxides having the general formula

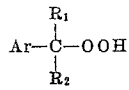

where Ar, $R_1$ and $R_2$ are the same as for the general formula for the peroxide above.

The hydroperoxides of the general formula

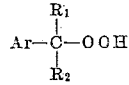

can be made by oxidation of an organic compound of the general formula

in which Ar, $R_1$, and $R_2$ represent the previously disclosed radicals. The process of oxidation is well known in the art and comprises essentially passing a gas containing free oxygen such as air through the organic compound in the liquid state at about 70° C. to 90° C., preferably in the presence of a hydroperoxide stabilizer such as dilute alkali, until between 5 and 50% hydroperoxide is formed. The hydroperoxide may be concentrated by reduced pressure distillation of the unoxidized fraction and any low boiling by-products and may be separated for further purification by forming a crystalline complex with sodium hydroxide or an amine such as aniline which can be separated by filtration in a state of high purity. The hydroperoxide can then be liberated from the crystalline complex by shaking with the calculated amount of dilute mineral acid to combine with the alkali or amine. The α,α-dialkyl-α-arylmethyl hydroperoxide separates from the aqueous phase as a substantially pure oily hydroperoxide which may be washed again with water and be used directly for conversion to the symmetrical peroxides by pyrolysis in accordance with this invention.

Although the examples have shown methods of purifying the peroxides obtained, the present invention is not limited to the production of highly purified peroxides since the crude pyrolyzate is highly useful for many applications without further purification. The peroxides may, however, be purified if desired by selective adsorption of impurities by clays, activated carbon, etc., or by selective solvent extraction using mixed solvents, or by crystallization.

The symmetrical bis($\alpha,\alpha$-dialkyl-$\alpha$-arylmethyl) peroxides produced as new compositions of matter by the process of this invention find a number of commercial applications. Those peroxides of the general formula in which Ar represents a hydrocarbon radical, particularly a phenyl or alkylated phenyl radical, have unusually good characteristics for use as catalysts in polymerization processes, halogenation reactions, etc., where high heat stability is desired. The bis($\alpha,\alpha$-dialkyl-$\alpha$-arylmethyl) peroxides are also useful in synthesis. They may, for example, be reduced by hydrogenolysis to the corresponding tertiary alcohols.

What we claim and desire to protect by Letters Patent is:

1. As a new compound a symmetrical bis($\alpha,\alpha$-dimethyl-$\alpha$-arylmethyl) peroxide.

2. As a new compound bis($\alpha,\alpha$-dimethylbenzyl) peroxide.

3. As a new compound bis($\alpha,\alpha$-dimethyl-p-methylbenzyl) peroxide.

4. As a new compound bis[$\alpha,\alpha$-dimethyl-$\alpha$-(2-naphthyl)methyl] peroxide.

5. The process which comprises pyrolyzing substantially pure $\alpha,\alpha$-dimethyl-p-methylbenzyl hydroperoxide in the absence of an active decomposition catalyst at a temperature within the range of about 100° C. and about 180° C. and separating bis($\alpha,\alpha$-dimethyl - p - methylbenzyl) peroxide from the pyrolyzate.

6. The process which comprises pyrolyzing substantially pure $\alpha,\alpha$-dimethyl-$\alpha$(2-naphthyl)methyl hydroperoxide in the absence of an active decomposition catalyst at a temperature within the range of about 100° C. and about 180° C. and separating bis[$\alpha,\alpha$ - dimethyl-$\alpha$(2-naphthyl)methyl]-peroxide from the pyrolyzate.

References Cited in the file of this patent

UNITED STATES PATENTS

| Number | Name | Date |
| --- | --- | --- |
| 2,403,771 | Vaughan et al. | July 9, 1946 |
| 2,403,772 | Vaughan et al. | July 9, 1946 |
| 2,501,966 | Rust et al. | Mar. 28, 1950 |
| 2,522,016 | Denison et al. | Sept. 12, 1950 |
| 2,527,640 | Lorand et al. | Oct. 31, 1950 |

OTHER REFERENCES

Hock et al.: Ber. 77, page 261 (1944).

Kharasch et al.: Jour. Organic Chem., vol. 15, pages 754, 759 (2 pages; July 1950).